Figure 1:
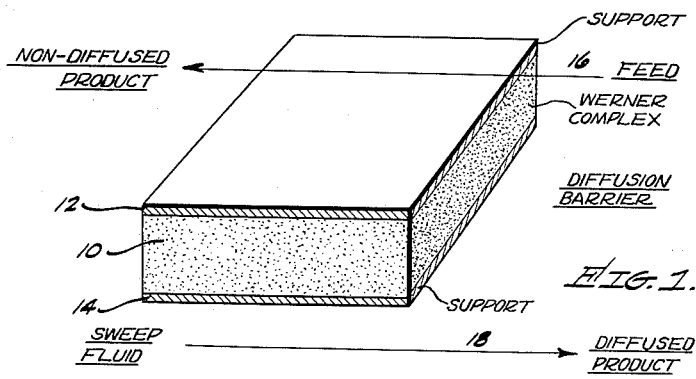

INVENTORS.
RAYMOND N. FLECK,
CARLYLE G. WIGHT,
BY
Richard C. Hartman
ATTORNEY

United States Patent Office 2,983,767
Patented May 9, 1961

2,983,767
DIFFUSIONAL SEPARATION OF AROMATIC COMPOUNDS

Raymond N. Fleck, West Covina, and Carlyle G. Wight, Fullerton, Calif., assignors to Union Oil Company of California, Los Angeles, Calif., a corporation of California Filed Feb. 2, 1959, Ser. No. 790,630
24 Claims. (Cl. 260—674)

The present invention relates to the separation of organic compounds, and in particular concerns an improved process for the diffusional separation of aromatic compounds which have similar physical and chemical properties but which differ in molecular configuration.

The separation of compounds by dialysis or diffusion has previously been based on either a solubility difference in the diaphragm barrier of the materials being separated or a dissimilarity in the rates of diffusion through the diaphragm caused by molecular weight differences. These prior art techniques failed to provide an effective method of separating aromatic compounds having similar molecular weights and solubilities, particularly those differing only in molecular configuration, e.g., the isomers of xylene.

It is accordingly an objective of the present invention to provide an improved diffusion barrier process for the separation of aromatic compounds from liquid and gaseous organic mixtures.

Another objective is to provide a novel diffusion process for the resolution of aromatic isomer mixtures.

Other and related objectives will be apparent from the following detailed description of the invention, and various advantages more specifically referred to herein will be apparent to those skilled in the art upon employment of the invention in practice.

We have now found that the foregoing objectives and their attendant advantages can be realized by passing a fluid organic mixture adjacent to a special diffusion barrier which includes a solid Werner complex hereinafter more fully described whereby certain components of the feed mixture readily diffuse through the barrier into the adjacent space. More particularly we have found that aromatic compounds can be easily separated from organic mixtures comprising the same by passing the mixture in either the liquid or vapor phase through a space confined by a diffusion barrier whose selective permeability results from the incorporation therein of a solid Werner complex, whereby the more readily diffusible aromatic components of the feed mixture selectively pass through the barrier into the adjacent space. A sweep fluid is then normally used to remove the diffused fraction from the adjacent space. As is hereinafter more fully explained, a free heterocyclic nitrogen base compound is included in the feed and sweep fluid streams for the purpose of maintaining the activity of the barrier material.

In conventional diffusion separation processes, the selectivity is due to the fact that the rate of diffusion of any particular component of the feed mixture through the barrier material is indirectly proportional to the molecular weight of that component, i.e., the lower molecular weight components of the feed diffuse through the barrier more readily than those of higher molecular weight. With the present barrier materials, however, the rate of diffusion is governed by the size and shape of the molecules involved. Accordingly, the present process permits sharp separation of even such closely related materials as position isomers, e.g., m- and p-xylene, etc.

In its simplest embodiment, the present invention entails a process wherein a feed zone and a product zone are separated by a solid diffusion barrier containing a Werner complex of a type more fully described below. The feed mixture to be resolved is admixed with a free heterocyclic nitrogen base and is introduced into the feed zone, and is passed therethrough more or less parallel to the barrier. During said passage the more readily diffusible components of the feed mixture diffuse through the barrier into the product zone from which they are removed as the diffusate or diffused product of the process. In order for such diffusion to take place, the concentration of the more readily diffusible components in the product zone must be lower than the feed zone. In accordance with the invention such lower concentration is attained by passing a sweep fluid through the product zone more or less parallel to the barrier. Under these conditions there is a driving force generated between the two zones which preferentially forces the more readily diffusible components from the feed zone through the barrier to the product zone.

Figure 2:
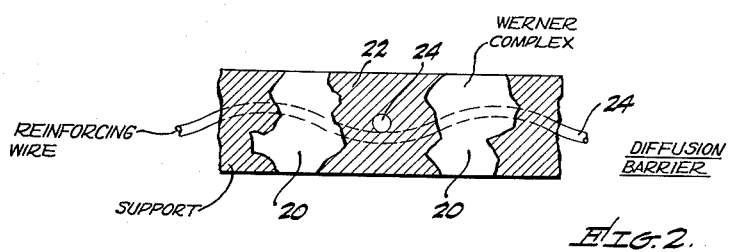
Figure 3:
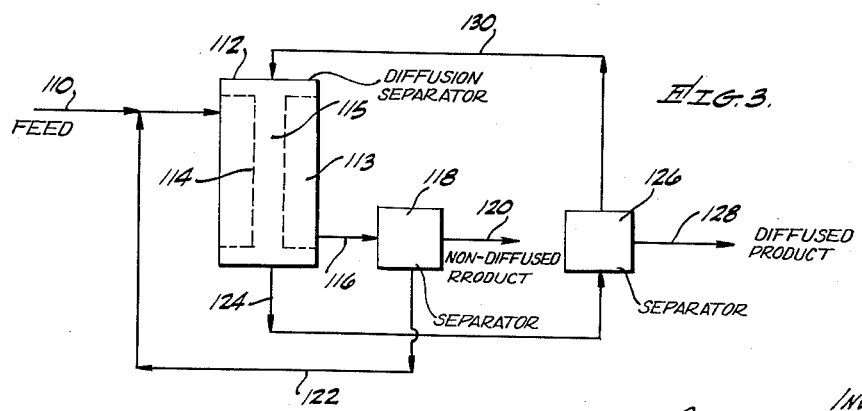

In the accompanying drawing which forms a part of the application, Figures 1 and 2 diagrammatically illustrate two ways in which suitable diffusion barriers may be constructed, and Fig. 3 is a process flow sheet illustrating the practice of the process of the invention in one of its simplest embodiments.

Considering now the process of the invention in further detail, it is generally applicable to any mixture of organic components which contains an aromatic compound differing in molecular configuration from the other components of the mixture. Ordinarily, of course, such mixtures are those which cannot conveniently be resolved by more conventional methods, e.g., fractional distillation, azeotropic distillation, fractional crystallization, etc. The present class of diffusion barriers displays a marked preference for passing aromatic compounds. The process is thus well adapted for separating aromatic compounds from admixture with aliphatic and naphthenic compounds, e.g., in treating petroleum hydrocarbon reformates to recover the aromatic components therefrom. The process is also well adapted to separating mixtures comprising substantially only aromatic compounds, e.g., mixtures of aromatic hydrocarbon isomers such as the alkylbenzenes, alkylnaphthalenes, alkylanthracenes, aryl-substituted benzenes, etc., as well as isomeric mixtures of aromatic compounds containing such functional groups as nitro, amino, halogen, carbonyl, and the like. A particularly important field of utility lies in the separation of alkylbenzene isomers in which each of the alkyl groups contains from 1 to 4 carbon atoms, e.g., mixed xylenes, cymenes, etc. For the most part, the present diffusion barriers preferentially pass the para-isomer, but by suitably modifying the structure of the barrier such preference can be changed in favor of the meta- and ortho-isomers.

The diffusion barriers employed in the process of the invention essentially comprise a solid coordination compound of the type known as a "Werner complex" consisting of one molecular proportion of a salt of a metal of atomic number greater than 12 coordinated with at least two molecular proportions of a heterocyclic nitrogen base. It is presumed that the molecular structure and configuration of the Werner complex are such that when contacted with a mixture comprising aromatic components, one or another of such components becomes entrapped or occluded within the lattice of the Werner complex to form an association compound of the clathrate type. For this reason, such a Werner complex is often referred to as a "clathrate-former," and the solid association compound is referred to as a "clathrate." Similarly, compounds which are capable of forming clathrates with the clathrate-former are said to be "clathratable."

We are aware that Werner complexes have been previously employed to effect separation of organic compounds by clathration. However, prior art processes require large quantities of the Werner complex to selectively hold the clathratable compounds. For example, the clathrate-formers in prior art processes are found in general to be capable of clathrating between about 5 percent to about 70 percent by weight of clathratable compounds. Contrary to this prior art teaching, we have found that certain aromatic compounds preferentially diffuse through relatively thin solid barriers containing the present class of Werner complexes whereby there is obtained excellent resolution of large volumes of a feed mixture with relatively minute amounts of Werner complex solids.

The Werner complexes employed in the diffusion barriers of our invention are characterized by the general formula:

$$X \cdot Z_y \cdot A_n$$

wherein X is a metal having an atomic number above 12, Z is a heterocyclic nitrogen base, A is a negative radical, y is a number from 2 to 6, and n is a number from 1 to 3. Such complexes and methods for preparing them are described in "Modern Aspects of Inorganic Chemistry" by Emelius and Anderson, and in "Textbook of Inorganic Chemistry," vol. X, by Sutherland. For the most part they are insoluble or only slightly soluble in water and hydrocarbons, and are moderately or readily soluble in halogenated hydrocarbons, ethers, esters, ketones, aldehydes, etc. According to one mode of preparation, such complexes are prepared in solid form by adding from two to six molecular equivalents of the heterocyclic nitrogen base ("Z" in the above formula) to an aqueous solution containing one molecular equivalent of a metal salt comprised of the "X" and "A" components. The insoluble complex precipitates, and is filtered off and dried, preferably in a stream of air at room temperature or slightly above. Other methods of Werner complex preparation are described by Shaeffer in U.S. Patent No. 2,798,891.

As stated, the metallic component of the complex ("X" in the above formula) may be any metal having an atomic number above 12. This includes primarily the metals of groups Ib, IIb, VIb, VIIb, and VIII of the periodic table, for example, iron, cobalt, nickel, copper, zinc, cadmium, silver, manganese, chromium, mercury, and molybdenum. Aluminum may also be used in some instances. The preferred metals are those of atomic number 25 to 28, inclusive, i.e., manganese, iron, cobalt and nickel.

The "A" component in the above general formula may be any negative radical, for example, thiocyanate $SCN^-$, isothiocyanate $NCS^-$, azide $NNN^-$, cyanate $NCO^-$, isocyanate $OCN^-$, cyanide $CN^-$, sulfate $SO_4^=$, nitrate $NO_3^-$, nitrite $ONO^-$, chloride $Cl^-$, bromide $Br^-$, iodide $I^-$, phosphate $PO_4^\equiv$, formate $HCOO^-$, acetate $CH_3COO^-$, and the like. A group of negative radicals found to be particularly effective for the present purposes consists of the thiocyanate, isothiocyanate, azide, cyanate, isocyanate and cyanide radicals. However, any radical may be utilized which is capable of producing a crystalline coordination complex with one of the above metals and a heterocyclic nitrogen base.

The "Z" component in the above formula may be any heterocyclic nitrogen base, and is selected to give a maximum selective diffusion for the particular isomer which is to be preferentially passed through the diffusion barrier. For example, if it is desired to isolate para-xylene, a suitable nitrogen base is gamma-picoline. Not all nitrogen bases are equally effective in forming complexes which will separate the desired component. For example, the beta-picoline complex with nickel thiocyanate is not as effective as the gamma-picoline complex for the diffusional separation of para-xylene, presumably because of the steric effects of the 3-methyl group. However, the beta-picoline complex may be used advantageously for separating other compounds. The nitrogen base should, therefore, be selected by a judicious combination of theoretical reasoning and actual testing of the complexes with the particular mixture to be separated. The overall molecular dimensions of the nitrogen base should in most cases approximate the molecular dimensions of the compound to be selectively passed by the barrier. A particularly preferred class of bases comprises the heterocyclic resonance-stabilized compounds which contain one to three hetero-N atoms. Suitable examples include pyridine, the picolines, pyrrole, pyrazole, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4-disubstituted pyridines. These compounds are sufficiently strong bases to form relatively stable Werner complexes, and the resulting complexes incorporated in a diffusion barrier are capable of selectively separating a wide variety of organic compounds. Examples of some of the substituted pyridines which are suitable in the process of this invention are 4-methylpyridine, 4-isopropylpyridine, 4-chloropyridine, 3-methylpyridine, 3-hydroxypyridine, 3-methyl-4-ethylpyridine, 4-fluoropyridine, 3-methoxypyridine, 3,4-dimethylpyridine, 3-acetylpyridine, 4-octylpyridine, and the like. Many other examples could be cited as will be apparent to those skilled in the art, and the complexes may include only one such base or a mixture of two or more bases in which case a mixed complex is formed. Other suitable bases are disclosed in the aforementioned Shaeffer patent.

Examples of suitable complexes which may be employed corresponding to the formula above, are as follows:

[Ni(gamma-picoline)$_4$(SCN)$_2$]
[Cu(gamma-picoline)$_4$(SCN)$_2$]
[Hg(gamma-picoline)$_4$(NNN)$_2$]
[Ni(1-hexylamine)$_6$(SCN)$_2$]
[Co(pyridine)$_4$(OCN)$_2$]
[Fe(pyrrole)$_4$(SCN)$_2$
[Cd(gamma-picoline)$_4$(CN)$_2$]
[Ag(gamma-picoline)$_2$(NNN)]
[Zn(aniline)$_4$(CN)$_2$]
[Cr(pyridine)$_4$SO$_4$]
[Ti(isoquinoline)$_3$(NH$_3$)$_3$(C$_2$O$_4$)$_2$]
[Ni(4-methylpyridine)$_4$Cl$_2$]
[Ni(4-methylpyridine)$_4$(NNN)$_2$]
[Ni(4-n-propylpyridine)$_4$(SCN)$_2$]
[Ni(4-cyanopyridine)$_4$(SCN)$_2$]
[Ni(methylisonicotinate)$_4$(SCN)$_2$]
[Ni(4-methylpyridine)$_4$(HCOO)$_2$]
[Ni(isonicotinamide)$_4$(SCN)$_2$]
[Ni(3-bromopyridine)$_4$(SCN)$_2$]
[Ni(isothionicotinamide)$_4$(SCN)$_2$]
[Ni(hexamethylenetetramine)$_2$(SCN)$_2$]
[Ni(isoquinoline)$_4$Cl$_2$]
[Ni(4-methylpyridine)$_4$Br$_2$]
[Mn(4-methylpyridine)$_4$(SCN)$_2$]
[Mn(isoquinoline)$_4$(SCN)$_2$]
[Zn(4-methylpyridine)$_4$Cl$_2$]
[Ni(4-ethylpyridine)$_4$(SCN)$_2$]
[Co(4-ethylpyridine)$_4$(SCN)$_2$]
[Fe(4-ethylpyridine)$_4$(SCN)$_2$]
[Mn(4-ethylpyridine)$_4$(SCN)$_2$]
[Ni(4-hydroxymethylpyridine)$_4$(SCN)$_2$]
[Ni(4-β-hydroxyisopropylpyridine)$_4$(SCN)$_2$]
[Ni(3,4-dihydroxymethylpyridine)$_4$(SCN)$_2$]
[Mn(4-β-hydroxyisopropylpyridine)$_4$(ONO)$_2$]
[Co(3-α-hydroxyethylpyridine)$_4$(HCOO)$_2$]
[Ni(4-aminopyridine)$_4$(SCN)$_2$]
[Ni(4-benzylpyridine)$_4$(SCN)$_2$]
[Ni(3-aminopyridine)$_4$(SCN)$_2$]
[Ni(3,4-dibromopyridine)(SCN)$_2$]

Obviously, many other compounds similar to the above can be employed as diffusion barriers, not all of which give optimum diffusional separation of all isomer pairs, but which are selected to meet the specific pecularities of the feed mixtures to be resolved.

The construction of a typical Werner complex diffusion barrier of our invention is shown in Fig. 1. A fluid-permeable solid supporting material 14 is employed to support a thin layer of the particular Werner complex 10 selected for a specific feed separation. Suitable fluid-permeable supporting or matrix materials include plastic, rubber, sintered metal, asbestos, tightly woven cloth, cellulose, and ceramic material such as alundum, aloxite and the like. The Werner complex barrier material can be maintained as a filter cake on a single barrier support but, preferably, a second support 12 is employed so that the structure takes the form of a "sandwich." The Werner complex can also be mechanically pressed into the pores of the support material or can be deposited directly therein by crystallization from a solution of the complex in such solvents as halogenated hydrocarbons, ethers, esters, ketones, aldehydes, etc. Ordinarily, the feed material is passed in contact with the barrier in the direction indicated by arrow 16. The more readily diffusible components of the feed stream diffuse longitudinally through the barrier, and are picked up and swept away from the barrier surface by the sweep fluid flowing in the direction indicated by arrow 18. Although such countercurrent feed and sweep fluid flow direction is preferable, the process is also operable with concurrent flow of these streams. Where the Werner complex barrier constitutes a filter cake or the like supported on only one side by a fluid-permeable support, it is preferred that the diffusion flow is first through the barrier and then through the support material.

In the case where the barrier is sandwiched between support materials, deposited in the pores of the support, incorporated in the support matrix as by casting, extrusion, etc., or mechanically pressed into the support material, diffused flow can exist in either direction through the barrier-support combination with equal effectiveness.

The Werner complex barriers of the present invention can also be formed as shown in Fig. 2 by incorporating the crystals in thin sheets or shapes with a fluid-impermeable material so as to expose any single crystal to both the feed zone and the product zone. A reinforcing wire or mesh 24 is generally included in the sheet or shape for structural strength. A suitable fluid-impermeable support material 22 is selected from such materials as casting resins, metals, or other materials which set up to form a solid fluid-impermeable support structure. Although not mandatory, it is preferable in the modification shown in Fig. 2 that the Werner complex barrier crystals 20 be all substantially the same size.

Although the diffusion barriers illustrated in Fig. 1 and Fig. 2 are shown as sections of a flat sheet, obviously the barrier support or matrix material can be shaped to produce cylindrical, conical, or other desired barrier shapes.

Obviously, many other forms of the diffusion barrier previously described in a general manner will become apparent to those skilled in the art. The method of preparation of the barrier and the geometrical form which it takes are not particularly critical, and the previous illustrations are given by way of explanation only. It is desirable, of course, that the barrier be relatively thin, with a relatively large stable lateral surface exposed to the feed and sweep fluid streams.

The sweep fluid which is employed to maintain a low partial pressure or concentration of the diffused materials on the product zone side of the barrier essentially comprises a heterocyclic nitrogen base, and usually consists of a mixture of a heterocyclic nitrogen base with a fluid which is inert with respect to the barrier and is readily separated from the diffused components of the feed mixture as well as from the heterocyclic nitrogen base. Suitable inert materials include hydrogen, nitrogen, carbon dioxide, non-aromatic hydrocarbons, halogenated non-aromatic hydrocarbons, aliphatic amines, ammonia, ethers, and aromatics, e.g., benzene, toluene, etc.

The heterocyclic nitrogen base which is added to the feed stream and which constitutes a component of the sweep fluid may be any of those previously mentioned in connection with the definition of the Werner complex compounds. Preferably, however, it is the same as that contained in the Werner complex. It has been found that by employing an excess of nitrogen base, over and above the stoichiometric proportion necessary for the chemical make-up of the active Werner complex, a substantial improvement is obtained in the stability and diffusional capacity of the complex and, in some case, the selectivity of the diffusional barrier is also improved.

The amount of free nitrogen base employed in the feed stream may vary widely. Any increment over the stoichiometric amount required to yield the desired Werner complex is beneficial. Suitable proportions range between about 0.001 and 1.0 part per part of feed by weight, and preferably between about 0.01 and about 0.5 part per part of feed. The optimum proportion will vary somewhat for each particular complex, and for the diffusion procedure employed. In each case, however, the optimum proportion may be easily determined by simply measuring the diffusional capacity of a graduated series of mixtures containing varying proportions of nitrogen base, and interpolating or extrapolating to define the optimum mixture, i.e., the mixture with minimum excess nitrogen base which will continuously pass the largest weight ratio of a particular feed component. The sweep fluid may comprise from as little as 0.1 percent to 100 percent by volume, preferably from about 1 percent to about 50 percent, free heterocyclic nitrogen base.

The free heterocyclic nitrogen base is conveniently added to the feed mixture or sweep fluid prior to introduction of these streams into the barrier contacting zones, but if desired it may be introduced thereunto as a separate stream.

The separation of the free heterocyclic nitrogen base from the resulting raffinate and diffusate streams may be accomplished by a number of conventional techniques such as extractive distillation, selective adsorption, fractional distillation, etc.

The diffusion barrier contacting operations may be carried out in either liquid or vapor phase under any combination of temperature and pressure conditions at which the Werner complex is stable. Thus, the temperature of the fluids in the feed and product zones may vary from as low as about −50° C. to as high as about 250° C. and the pressure in the feed zone may be subatmospheric, atmospheric or superatmospheric with an equal or lower pressure in the product zone. The pressure differential between the feed and product zones may be the primary driving force across the diffusion barrier in which case, depending on the mechanical strength of the barrier, the differential may be from a fraction of a p.s.i.g. to a thousand or more p.s.i.g. For the most successful operation of the process it is necessary that the concentration of the more readily diffusible component be kept at a maximum on the feed zone side of the diaphragm and at a minimum on the product zone side.

The operational principles of the process are illustrated in Figure 3 of the drawing which shows in diagrammatical form a flow plan of a specific embodiment of the invention.

Referring now to said drawing, the feed stream consists of an organic mixture containing para-xylene and meta-xylene which enters the process via line 110. A recycle stream of a heterocyclic nitrogen base, gamma picoline, is introduced in the ratio of 1 part of base to 9 parts feed into line 110 from line 122 and is admixed with the feed stream. The resultant feed and free heterocyclic nitrogen base mixture passes into diffusion vessel 112. A cylindrical shaped diffusion barrier 114 is provided internally in diffusion vessel 112 and divides the interior thereof into an annular feed zone 113 and a cylindrical product zone 115. The feed-base mixture passes through feed zone 113 essentially parallel to barrier 114 to outlet line 116. As the feed mixture passes the barrier surface, which comprises a solid nickel tetra-gamma picoline dithiocyanate Werner complex, the para-xylene more readily diffuses through the barrier into product zone 115 while the less readily diffusible meta-xylene continues through feed zone 113 and passes from diffusion vessel 112 to separator 118 via line 116. In separator 118 the gamma-picoline is separated from the meta-xylene rich raffinate and is recycled to line 110 via line 122. The meta-xylene rich product of the process is removed to storage from separator 118 via line 120. The sweep fluid, consisting of a 50–50 mixture of vaporized gamma-picoline and methane is introduced into product zone 115 of diffusion vessel 112 from line 130.

The para-xylene which diffuses through barrier 114 into product zone 115 is caught up in the sweep fluid and is carried out of vessel 112 through line 124 and is passed to separator 126. In separator 126, the methane and gamma-picoline are separated from the diffused para-xylene rich product of the process. The methane-picoline mixture is then recycled to diffusion vessel 112 via line 130. The para-xylene-rich product of the process is removed from separator 126 to suitable storage via line 128.

The following examples specifically illustrate the practice of the invention.

EXAMPLE I

A number of representative liquid phase separations carried out with a variety of Werner complex diffusion barriers, feed mixtures, and sweep fluids are shown in Table 1. The diffusion barriers, constructed as shown in Figure 1, separate the feed and product zones which are maintained at 100° C. and atmospheric pressure. The free heterocyclic nitrogen base present in both the feed and sweep streams is identical to that used in the Werner complex of the diffusion barrier.

EXAMPLE II

A number of diffusional separations carried out in the vapor phase are shown in Table 2. In these runs the diffusion barriers separate the feed and product zones which are maintained at about 150° C. and an absolute pressure of about 100 mm. of Hg. The free nitrogen base present in both the feed and sweep streams is the same as the base in the Werner complex of the diffusion barrier.

Table 2

| Diffusion Barrier | Feed | Selectively Diffused Component | Sweep Fluid |
|---|---|---|---|
| Mn(4-ethylpyridine)$_4$(CNO)$_2$ | Ortho-, meta-, and para-xylene and ethylbenzene | Ortho | Methane. |
| Mn(4-ethylpyridine)$_4$(CN)$_2$ | do | do | Do. |
| Mn(4-ethylpyridine)$_4$Cl$_2$ | do | do | Do. |
| Mn(4-ethylpyridine)$_4$(SCN)$_2$ | Ortho-, meta-, and para-xylene | Para | Do. |
| Fe(4-methylpyridine)$_4$(SCN)$_2$ | do | do | Do. |
| Fe(4-ethylpyridine)$_4$(SCN)$_2$ | do | do | Do. |
| Co(4-methylpyridine)$_4$(SCN)$_2$ | do | do | Do. |
| Ni(4-acetylpyridine)$_4$(SCN)$_2$ | Ortho-, meta-, and para-xylene and ethylbenzene | Ethylbenzene | Do. |
| Ni(3-ethyl-4-methyl-pyridine)$_4$(SCN)$_2$ | do | Meta | Do. |
| Ni(3-amido-pyridine)$_4$(SCN)$_2$ | do | Para | Do. |
| Ni(ethyl-isonicotinate)$_4$(SCN)$_2$ | do | do | Hydrogen. |
| Ni(4-vinylpyridine)$_4$(SCN)$_2$ | Ortho-, meta-, and para-xylene | do | Methane. |
| Ni(3-cyanopyridine)$_4$(SCN)$_2$ | do | do | n-Hexane. |
| Ni(isoquinoline)$_4$(SCN)$_2$ | do | do | Do. |
| Ni(4-ethylpyridine)$_4$(HCOO)$_2$ | Ortho-, meta-, and para-xylene and ethylbenzene | Ortho | Do. |
| Ni(4-methylpyridine)$_4$(NO$_2$)$_2$ | do | do | Do. |
| Ni(4-hydroxymethylpyridine)$_4$(SCN)$_2$ | do | do | Do. |
| Co(4-ethylpyridine)$_4$(SCN)$_2$ | do | Para | Do. |

The above examples are illustrative of some of the separations which are conveniently made with the Werner complex diffusion barriers in accordance with the invention. Obviously, the diffusion barriers mentioned above may be used to separate other mixtures than those shown, and may be interchanged in the various examples. Also, many similar complexes can be substituted in the diffusion barriers for those used in the above examples.

Other modifications and adaptations which would occur to one skilled in this particular art are to be included in the spirit and scope of this invention as defined by the following claims.

We claim:
1. A process for separating a fluid mixture of organic compounds comprising an aromatic compound and at least one other organic compound differing in molecular configuration from said aromatic compound into a first fraction and a second fraction, the relative proportions of said compounds in each of said fractions differing from the relative proportions of said compounds in said fluid mixture, which process comprises: (1) introducing said mixture into a feed zone and therein flowing said mixture substantially parallel to and in contact with a diffusion barrier comprising a solid Werner complex consisting of one mole proportion of a salt of a metal of atomic number above 12 coordinated with at least two mole proportions of a heterocyclic nitrogen base, said barrier being relatively thin with a large stable lateral surface; (2) within a product zone on the opposite side of said diffusion barrier maintaining the concentration of said aromatic compound at a value below that existing in said feed zone, whereby said aromatic compound is caused

Table 1

| Diffusion Barrier | Feed | Selectively Diffused Component | Sweep Fluid |
|---|---|---|---|
| Ni(4-methylpyridine)$_4$(SCN)$_2$ | Ortho- and para-toluidine | Para | Iso-octane. |
| Do | Ortho, meta-, para-chlorotoluene | do | Do. |
| Do | Ortho- and para-methylanisoles | do | Iso-nonane. |
| Do | Naphthalene, diphenyl | Naphthalene | Normal decane. |
| Do | 1- and 2-methylnaphthalene | 1-methylnaphthalene | Normal tridecane. |
| Do | Ortho- and para-nitrotoluenes | Para | Iso-octane. |
| Do | Ortho- and para-dichlorobenzenes | do | Do. |
| Do | Ortho-, meta-, and para-cymene | do | Do. | to pass from said feed zone through said diffusion barrier into said product zone; (3) withdrawing said first fraction from said product zone; (4) withdrawing said second fraction from said feed zone; and (5) maintaining within said product zone and said feed zone a substantial concentration of a free heterocyclic nitrogen base compound.

2. A process as defined by claim 1 wherein an inert sweep fluid is passed through said product zone at a rate sufficient to maintain the concentration of said aromatic compound in said product zone at said value below that in said feed zone.

3. A process as defined by claim 2 wherein said fluid mixture, said sweep fluid and said free heterocyclic nitrogen base compound are maintained in the vapor phase.

4. A process as defined by claim 2 in which the direction of flow of said sweep fluid in said product zone is opposite to the direction of flow of said mixture in said feed zone.

5. A process according to claim 2 wherein said Werner complex has the general formula $X \cdot Z_y \cdot A_n$, wherein X is a metal having an atomic number above 12, Z is a heterocyclic nitrogen base, $y$ is a number from 2 to 6, A is a monovalent negative radical, and $n$ is a number from 1 to 3.

6. A process according to claim 2 wherein said mixture of organic compounds comprises at least two aromatic hydrocarbons differing in molecular configuration.

7. A process according to claim 2 wherein said mixture of organic compounds comprises at least two isomeric dialkyl-benzenes.

8. A process according to claim 2 wherein said mixture of organic compounds comprises para-xylene and at least one member selected from the group consisting of ortho-xylene, meta-xylene and ethyl-benzene.

9. A process according to claim 2 wherein the free heterocyclic nitrogen base compound maintained in said feed and product zones is the same as that contained in said Werner complex.

10. A process as defined by claim 3 in combination with the step of maintaining the pressure in said product zone at a value lower than that in said feed zone.

11. A process for separating a fluid mixture of organic compounds comprising an aromatic compound and at least one other organic compound differing in molecular configuration from said aromatic compound into a first fraction and a second fraction, the relative proportions of said compounds in each of said fractions differing from the relative proportions of said compounds in said fluid mixture, which process comprises: (1) introducing said mixture into a feed zone and therein flowing said mixture substantially parallel to and in contact with a diffusion barrier comprising a solid Werner complex consisting of one mole proportion of a salt of a metal of atomic number above 12 coordinated with at least two mole proportions of a heterocyclic nitrogen base, said contacting being effected in the presence of a free heterocyclic nitrogen base compound introduced into said feed zone, said diffusion barrier being relatively thin with a large stable lateral surface; (2) flowing an inert sweep fluid through a product zone on the opposite side of said diffusion barrier in the presence of a free heterocyclic nitrogen base compound introduced into said product zone, whereby said aromatic compound is caused to pass from said feed zone through said diffusion barrier into said product zone; (3) withdrawing from said product zone a diffused fraction comprising said aromatic compound, said sweep fluid and the free heterocyclic nitrogen base compound introduced into said product zone; (4) withdrawing from said feed zone a non-diffused fraction comprising non-diffused components of said feed mixture and the free heterocyclic notrogen base compound introduced into said feed zone; (5) treating said diffused fraction to separate the said sweep fluid and free heterocyclic nitrogen base compound therefrom to obtain said first fraction; (6) treating said non-diffused fraction to separate said free heterocyclic nitrogen base compound therefrom to obtain said second fraction; (7) returning separated sweep fluid and free heterocyclic nitrogen base compound to said product zone; and (8) returning separated free heterocyclic nitrogen base compound to said feed zone.

12. A process according to claim 11 wherein said fluid mixture, sweep fluid, and free heterocyclic nitrogen base are maintained in the vapor phase.

13. A process according to claim 11 wherein the free heterocyclic nitrogen base compounds introduced into said product zone and said feed zones are identical and the same as that contained in said Werner complex.

14. A process according to claim 11 wherein said mixture of organic compounds comprises at least two aromatic hydrocarbons differing in molecular configuration.

15. A process according to claim 11 wherein said mixture of organic compounds comprises at least two isomeric dialkyl benzenes.

16. A process according to claim 11 wherein said mixture of organic compounds comprises para-xylene and at least one member selected from the group consisting of ortho-xylene, meta-xylene and ethyl benzene.

17. A process according to claim 11 wherein said Werner complex has the general formula $X \cdot Z_y \cdot A_n$ wherein X is a metal having an atomic number above 12, Z is a heterocyclic nitrogen base, $y$ is a number from 2 to 6, A is a monovalent negative radical, and $n$ is a number from 1 to 3.

18. A process according to claim 17 wherein said heterocyclic nitrogen base is a substituted pyridine.

19. A process according to claim 18 wherein said metal is cobalt.

20. A process according to claim 18 wherein said metal is iron.

21. A process according to claim 18 wherein said metal is manganese.

22. A process according to claim 18 wherein said metal is nickel.

23. A process according to claim 17 wherein said heterocyclic nitrogen base is 4-methyl pyridine.

24. A process according to claim 17 wherein said monovalent negative radical is the thiocyanate radical.

References Cited in the file of this patent

UNITED STATES PATENTS

| | | |
|---|---|---|
| 2,540,151 | Weller et al. | Feb. 6, 1951 |
| 2,798,103 | Schaeffer et al. | July 2, 1957 |